OPTICAL COINCIDENCE DATA ANALYSIS SYSTEM

Filed Nov. 8, 1965

INVENTOR
GEORGE E. GANTNER, JR.
BY [signature]
ATTORNEY

United States Patent Office 3,480,763

Patented Nov. 25, 1969

3,480,763

OPTICAL COINCIDENCE DATA ANALYSIS SYSTEM

George E. Gantner, Jr., 6641 Pershing, University City, Mo. 63130

Filed Nov. 8, 1965, Ser. No. 506,740

Int. Cl. G06k *19/00, 7/00, 21/00*

U.S. Cl. 235—61.12 1 Claim

ABSTRACT OF THE DISCLOSURE

A superimposable card system including a master card and a plurality of feature cards. The master card is perforated for each entry into the system and the feature cards are perforated at any given locus only if an entry associated with that locus is characterized by the feature associated with that feature card. The master card is provided with a diagram, in the form of a graph or chart, which determines the locus of each entry into the system.

This invention relates to superimposable card systems used for retrieving and correlating technical data in which punched cards are superimposed over a light source in order to determine the "addresses" and numbers of the items meeting the qualifications of the search question.

Superimposable card systems now in use are based on the principle that each card will represent one characteristic in the system and that there will be one space on each card dedicated to each item.

In the systems now in use, data are entered by selecting the cards which describe the item of information desired to be entered, positioning the drill or punch to the next consecutively available space in the system as a whole, and entering a hole in that space.

In the systems now in use, when the data being collected are composed of a single test and selected modifiers, in order to construct a population distribution curve, all data entered into the system must be graphed by hand on a separate paper which, when completed, will bear no relationship to the card system aside from the use of common data.

Systems now in use also lack the ability to be visually analyzed without the use of tedious counting processes and standard statistical methods which again bear no relationship to the card system aside from the use of common data.

One of the objects of this invention is to provide an optical coincidence data analysis system in which a population-distribution curve is automatically constructed as data are entered into the system.

Another object of this invention is to provide an optical coincidence data analysis system in which visual analysis of data entered into the system may be easily accomplished at any time as data are entered into the system.

Another object of this invention is to provide an optical coincidence data analysis system in which arbitrary coordinate positions for the entry of data pertaining to specific documents or individuals are determined by the position of such documents or individuals on a standard or predetermined diagram in the form of a graph, chart, or table.

Other objects will become apparent to those skilled in the art in the light of the following description and accompanying drawings.

In accordance with this invention, generally stated, an optical coincidence data analysis system is provided in which the coordinates of the data-representing holes drilled or punched into the cards which comprise the system are determined by a diagram on a master card which is punched or drilled each time data are entered into the system.

Modifier or feature cards are punched only when the datum represented by the feature card is present in the individual or document being encoded.

In contrast to present systems in which the next consecutively available space is used on all the cards as the locus for a hole representing information to be entered, in the system of this invention, the locus of the hole is determined either by test value and number of previous identical test values or by the position of the document or individual on a predetermined chart on the face of the master card. The latter is especially useful for charts or tables such as genetic family charts or periodic tables.

When entering data into one embodiment of system of this invention, a test value directs the selection of a horizontal position coordinate. The next available space in the column corresponding to the horizontal position coordinate represents the total number of identical test values and determines the vertical position coordinate. This information is readily apparent on the face of the master card. At the same time the coordinates of the locus thus selected are entered on a master list of data encoded in any convenient fashion. Feature cards describing the data being encoded are punched at the same time.

It will be readily apparent that the use of this locus assignment procedure will automatically construct a data population curve which ordinarily will assume a "bell shaped" or "Gaussian" configuration but which may assume a bimodal or unusually shaped configuration and yet be normal for the population and for the test. For purposes of illustration the "bell shaped" or "Gaussian" configuration will be used. Trends become immediately visible on the face of the master card as the curve develops. A poorly designed test may be detected at this point as well.

When decoding a system of this invention, other advantages appear. If numerical values are listed, the actual number of entries in each column, times the value of that column, can be quickly calculated and used for derivation of Mean, Standard Deviation, and other computations. The principle of column height times value holds for any size of population with no increase in the number of mathematical operations. To obtain the "Mean" in a population of 1,000 with 20 categories requires only 42 operations taking data from the master card, whereas the standard systems require 1,001 operations.

In the drawings, FIGURE 1 is a plan view of a master card used in this invention upon which data have been entered;

Figure 1:
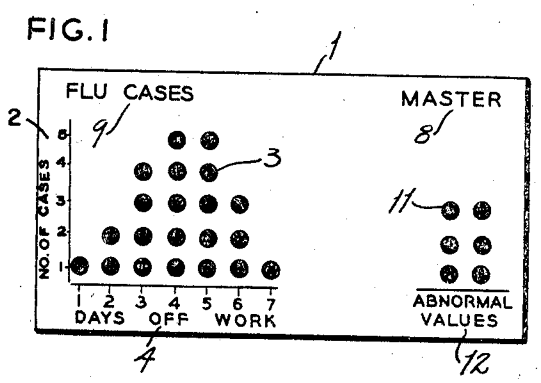

Referring now to the drawings for one illustrative embodiment of optical coincidence data analysis system of this invention, and particularly to FIGURES 1–4, in FIGURE 1, reference numeral 1 indicates a master card, reference numeral 4 indicates a horizontal coordinate scale on the face of master card 1, reference numeral 2 indicates a vertical coordinate scale on the face of master card 1, reference numeral 3 indicates holes punched into the master card 1 as data have been entered into the system, reference numeral 8 indicates a designation, in this case MASTER, reference numeral 11 indicats data punches outside of the coordinate scales 2 and 4 and reference numeral 12 indicated a designation of data punches 11, in this case "Abnormal Values."

Figure 2:
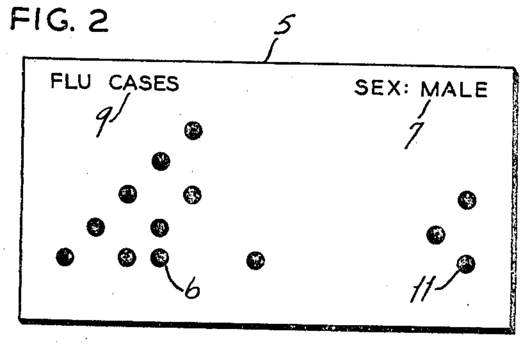
FIGURE 2 is a plan view of a feature card used in this invention upon which data have been entered.

In FIGURE 2, reference numeral 5 indicates a feature card of the system of master card 1. Feature card 5 includes holes 6 which have been drilled or punched into the system when the feature represented by the feature card, in this case male sex, is present in the individual whose data is being entered into the system, a feature designation 7, and the system or set designation 9.

Figure 3:
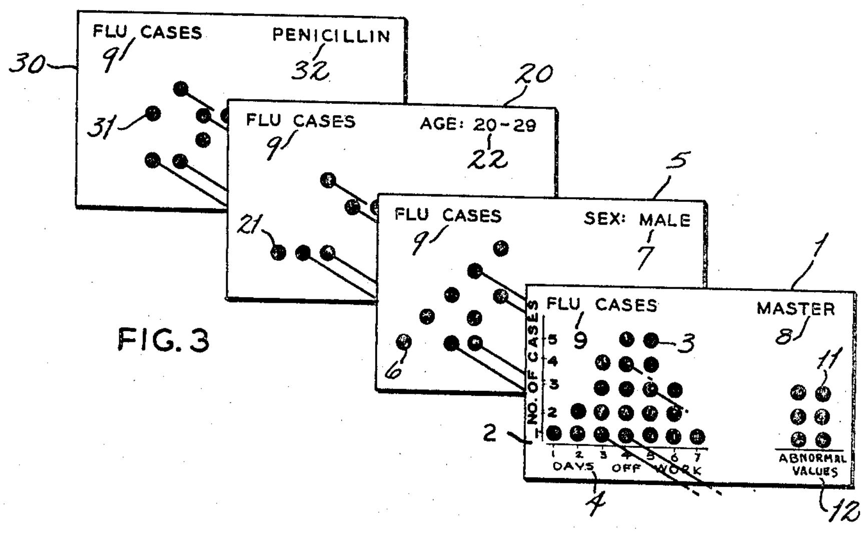
FIGURE 3 is an expanded view of a master card and three feature cards.
Figure 4:
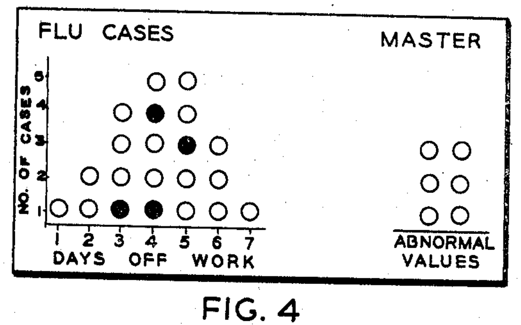
FIGURE 4 is a plan view of the cards shown in FIG. 3 after they have been superimposed over a light source.

In FIGURE 3, reference numeral 20 indicates a second feature card including data punches 21, a feature designation 22, and the set designation 9. Reference numeral 30 indicates a third feature card including data punches 31, a feature designation 32, and the set designation 9.

The system of master card 1 of the illustrative embodiment is designed for a check of absenteeism caused by flu in terms of the number of days absent. In the illustration, a check is being made for the efficacy of various medications, however, many other factors such as age and sex are also considered. A pure test for the effectiveness of medications would include only the master card 1 and feature cards such as card 30 representing various medications. In a study in depth of the foregoing question an obvious direction of inquiry would be amount of dosage categorized as low-normal, normal, high-normal and abnormal. If the ranges for each category for each medication are predetermined, only four extra feature cards are necessary to add this important adjunct to the system.

The feature cards 5, 20 and 30 of the system illustrated are designed to complement master card 1. In this case, card 5 represents male sex, and, while it is not illustrated, this set of cards would also contain a female sex feature card unless this information was not needed. Card 20 of this system represents an age group of 20 to 29, one of a series of mutually exclusive age group cards. Card 30 of this system represents penicillin, signifying that this medication has been given to the same number of cases as there are perforations in the card.

In the operation and use of the data analysis system illustrated and described, as an example, in order to enter data into the system about a male between the ages of 20 and 29 who was given penicillin, all feature cards such as cards 5, 20 and 30 which describe the data being entered into the system are removed from their file and aligned with the master card 1. If the individual whose data is being encoded has been off work due to flu for 6 days, the punch will go in the 6 column on horizontal coordinate scale 4. The coordinate of the punch on the vertical scale 2 is determined by the number of previous punches in the six column of horizontal scale 4, with the new data being placed in the next available locus in that column. This location is now assigned and listed in the master list of documents or individuals if such a list is being maintained.

As another specific example, if it is desired to incorporate into the system data pertaining to one John Doe, male, age 25, no medication, and absent from work due to flu for 4 days, the following operations are carried out.

(1) The master card for flu case absenteeism and feature cards (1) for age 20–29, (2) male, and (3) no medications, all from the flu absenteeism set, are removed from their file and aligned, with the master card on top, under a punch or drill.

(2) Since Mr. Doe was absent for 4 days, the punch or drill is positioned over the 4 position on the horizontal coordinate scale.

(3) Observation of the master card will show that there are six punches in the column above the four position on the horizontal scale. Therefore the next available locus is in the seventh position on the vertical scale, and the punch or drill is positioned over horizontal 4, vertical 7 and a hole is made through all the cards under the drill or punch at one time.

(4) The location of the punches representing Mr. Does are now listed in a master list of documents or individuals, if such a list is being kept, as 4–7.

(5) All of the cards are next removed from the punch or drill and replaced in the file, which contains all the other feature cards, representing other characteristics, which have been theretofore punched, also simultaneously with the master card.

It becomes readily apparent that a distribution curve is automatically constructed on the face of the master card since the number of days off work most commonly taken by flu victims will have the highest column, and the number of days off least taken will have the shortest column. This provides an instantly available source of information about trends. If the number of days off taken by the individuals entered into the system is increasing, the emphasis of the distribution curve on master card 1 will shift to the right on horizontal scale 4.

In the cases where the number of test values is low, and the number of individuals or documents to be entered is high, more than one position on the horizontal scale may be assigned to each test value so that for each two or more identical test values, the vertical coordinate changes by one. This procedure constructs a much "flatter" curve than would otherwise be obtained and eases the column height restriction imposed by card size.

Also instantly available on the face of the master card are the total number of entries into the system and the number of individuals exhibiting each test value, in this case, number of days off work. In other fields of inquiry, the values will, of course, be different. For example, the values may be amount of medication in units administered, duration of medication, blood levels of medication, blood count, serum LD or CPIC levels, height, weight, age, workers' output in pieces per hour, or test results, to name only a few.

In decoding or data retrieval from a system of this invention, those feature cards which describe the search question are removed from their file and superimposed with or without the master card.

If the search question is: How many males between the ages of 20 and 29 inclusive who were given penicillin stayed off work for four days due to flu?, cards 1, 5, 20 and 30 are superposed over a light source or dark surface and the answer obtained by the simple process of counting the number of optically coincident (light transmitting) holes in the fourth column of horizontal scale 4. In the illustrative example, two had these characteristics (see FIGURES 3 and 4).

If an inquiry involving fewer characteristics is made, fewer feature cards, or combinations of feature cards alone can be used. For example, if it is desired to determine the distribution of male flu cases in terms of days off or in comparison with the total of cases only the master card 1 and feature card 5 would be used. If the number of male flu cases receiving penicillin is to be determined, feature cards 5 and 30 can be superimposed and the number of coincident holes counted.

Unlike systems known heretofore, the system of this invention allows the decoder to tell at a glance in the illustrative embodiment described above whether a particular category tends toward low absenteeism or high absenteeism, and further, exactly what was the most common number of days off taken by members of the search question group. It can be seen that much and varied information can be had readily and in convenient form.

The convenience and ease by which this varied information can be retrieved provides a high degree of what is called, for lack of a better term, browseability. Browseability is the adaptability of the system to random correlative searches, rather than distinct search questions. Since trends and interconnections may be compared with the population as a whole on the face of the master card, browsing through the cards tends to reveal hitherto unexpected correlations to a much greater extent than browsing through cards of standard systems.

Figure 5:
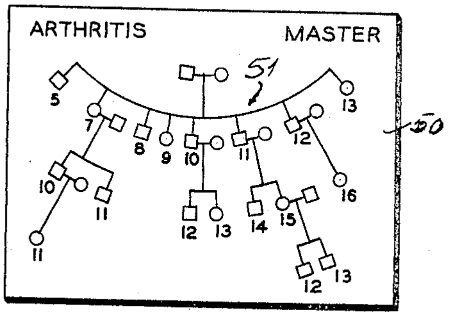
FIGURE 5 is a plan view of another embodiment of master card of a system of this invention.

Referring now to FIGURE 5 for another illustrative embodiment of system of this invention, reference numeral 50 indicates a master card upon the face of which there is a genetic family chart 51.

Entry of data into the system of master card 50 is accomplished by determining the position on the family chart 51 of the individual whose characteristics are being entered and placing a data punch in this position in all feature cards describing the individual. Retrieval of data is accomplished in the standard fashion with the added advantage of instant recognition of developing trends and relations, due to the use of the chart as sole coordinate determinant. When all data have been entered into a system of this type, relationships may be determined without the use of separate work sheets, for the most part. The type of system shown in FIGURE 5 is adaptable to all charts and tables such as periodic tables, valence tables, and even maps.

Purely by way of illustration and not by way of limitation, the cards used in the system may be 10 by 11 inches in size with 10,000 hole positions, a standard size. Other sizes may be used with equal efficacy, however.

Many other embodiments of this invention are possible. For instance, a card could be divided into several fields, each containing a different set of data in cases where the amounts of data in each field are small enough. In this embodiment, several different curves or charts will appear on the face of the cards. This is especially useful in the case of multiple tests on the same subjects, or the same tests over repeated intervals. In use of multiple fields, all of the curves may be compared at once on the face of the master card, or in the case of differing data subjects, separate master cards for each field may be used to limit observation to that field.

Numerous variations in the construction and use of the data analysis system of this invention within the scope of the appended claim will occur to those skilled in the art in the light of the foregoing disclosure.

Having thus described the invention, what is claimed and desired to be secured by Letters Patent is:

1. In an optical coincidence data analysis system expressing a defined field of inquiry, the improvement comprising a master card which is perforated each time a datum is entered into the system, feature cards each related to the defined field, and a diagram on said master card, said diagram determining the locus of all perforations on said master card and all feature cards in the system, said diagram comprising a pair of coordinate scales, the location of a perforation in the system along one of said coordinate scales being determined by a value of the datum being entered in a predetermined test and the location of said perforation in the system along the other of said coordinate scales being determined by the number of previous identical values of said test.

References Cited

UNITED STATES PATENTS

| | | | |
|---|---|---|---|
| 1,526,717 | 2/1925 | Nunez | 35—17 |
| 3,186,111 | 6/1965 | Lawlor. | |
| 3,263,999 | 8/1966 | McCoy | 129—16.1 XR |

MAYNARD R. WILBUR, Primary Examiner

S. SHEINBEIN, Assistant Examiner

U.S. Cl. X.R.

35—17; 129—16.1; 235—61.11; 250—219